Nov. 5, 1946.  A. C. DAMAN  2,410,429
AGITATION AND AERATION APPARATUS
Filed March 6, 1944
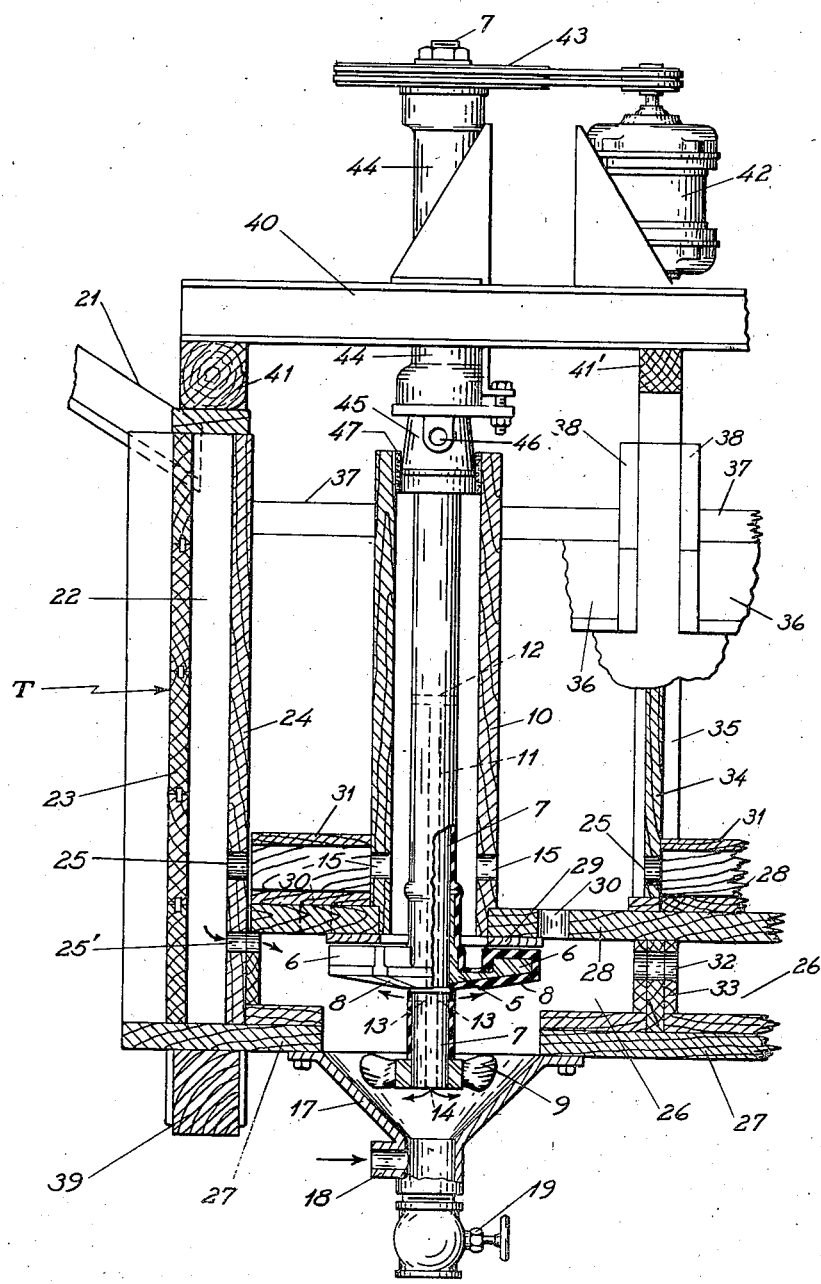
ARTHUR C. DAMAN
INVENTOR.
BY
ATTORNEY Patented Nov. 5, 1946

2,410,429

UNITED STATES PATENT OFFICE 2,410,429

AGITATION AND AERATION APPARATUS

Arthur C. Daman, Denver, Colo., assignor to Mining Process and Patent Company, Denver, Colo., a corporation of Delaware Application March 6, 1944, Serial No. 525,208

15 Claims. (Cl. 261—93)

This invention relates to agitation and aeration apparatus. More particularly, this invention relates to the agitation and aeration of pulp consisting of ground ore suspended in or carried by water, as in conditioning such pulp prior to separation of certain constituents thereof by flotation.

This application is related to the copending application of myself, Thomas S. Bailey, Jr., and Leland H. Logue, Serial No. 363,278, filed October 29, 1940, now issued as U. S. Patent No. 2,343,274 on March 7, 1944. With respect to proper subject matter, this application relates back to said application Serial No. 363,278.

Through conditioning, the ore pulp is treated to prepare the pulp for the flotation machine, and the various chemicals and collectors are intermixed with and given time to react with the mineral particles. Although conditioning is primarily based upon agitation, it is also desirable to provide a supply of gas, normally air, for intermixture with the pulp during agitation, as by a rotary impeller, to insure sufficient diffusion of gas through the material acted on by the impeller. In general, it is desirable to provide an adequate supply of atmospheric air for the aeration requirements of agitation and aeration apparatus. Thus, an object of the present invention is to provide apparatus for agitating and aerating pulp which will accomplish the above.

A further object of the invention is to provide adequate recirculation of material, particularly fines tending to settle with coarse solids, and also to provide for the withdrawal of settling coarser solids from the pulp body, if desired.

A further object of the invention is to provide a novel conditioner which is efficient in operation and enhances the operation of subsequent apparatus utilized in the ore separation process, such as the more expensive flotation machines.

Additional objects and novel features of this invention will become apparent from the following description, taken in connection with the accompanying drawing, which is a vertical cross section showing one unit of a multi-unit conditioner constructed in accordance with this invention.

Apparatus constructed in accordance with this invention, as illustrated in the drawing, may comprise one unit of a multiple unit conditioner which includes a disk impeller 5 disposed in the lower portion of a body of pulp and provided with vanes 6 on the upper side. The impeller is mounted on and rotated by a shaft 7, and lower vanes 8 may be formed on the impeller so as to assist in agitating pulp and discharging it toward the periphery of the impeller. A primary agitation and aeration zone is established by the impeller, and a lower agitation zone may be established by a propeller 9, preferably a screw type or so-called "ship" propeller, which is mounted on the lower end of shaft 7. Propeller 9 also positively moves settled solids, particularly fines carried along with coarser solids, upwardly to the primary agitation zone. Propeller 9 is preferably sufficiently close to impeller 5 to feed fines and the like directly thereto.

Normally, air and pulp are supplied to the upper portion of the primary agitation zone through a housing 10, which is square as shown, but may have any other desired form. Housing 10 extends upwardly to a point above the normal level of the pulp body and is adapted to supply atmospheric air to the impeller, which air is normally drawn downwardly through the housing by the suction effect of the impeller. In addition, air is supplied to the lower portion of the primary agitation zone, and also to the secondary agitation zone, by a conduit 11 formed in shaft 7 and having an inlet 12 at its upper end. Inlet 12 lies within housing 10, and outlets 13 are just beneath the impeller, while an additional outlet 14 is below the propeller 9. It sometimes happens, when a considerable load is placed upon the impeller, the vortex action becomes pronounced in housing 10, and the quantity of pulp in the housing reduces the supply of air to the impeller; and, in such cases, an auxiliary air supply which also functions at all times, is provided by conduit 11.

Air supplied through conduit 11 and outlets 13 flows outwardly to the periphery of the impeller, to diffuse into and be mixed with the agitated pulp discharged at the impeller periphery. At the same time, there is some mixing by the lower vanes of the impeller which, combined with the intermixture occurring at the periphery of the impeller, enhances the aeration action even when the maximum amount of air is being drawn through the housing. There is also an additional intermixture of air with incoming pulp tending to flow upwardly due to the recirculating action of the impeller, and also due to the agitating and mixing action of propeller 9.

Since pulp may contain material which varies in size, ranging from very fine to very coarse, and also foreign or "tramp" material, such as pieces of wood, steel, and the like, accidentally included in the pulp, there is a tendency for the coarse and tramp material to settle out in the lower portion of the body of pulp, and to carry with it some of the fines. The recoverable coarse material which cannot be effectively treated may be reground to a finer size, or, if too intermixed with tramp material to be usable, may be discarded. Also, any free gold, being much heavier tends to settle in the bottom of the pulp body. Therefore, one or more of the units of the conditioner, normally the first, may be provided with a conical collecting trough 17 disposed directly beneath the impeller. As the coarse and/or tramp material settles out, carrying with it some of the fines, wash water may be introduced through a pipe 18, at the bottom of the collecting trough, to wash the fines upwardly and, if necessary, separate them from the coarse material settling out. The fines are drawn and positively moved upwardly by propeller 9 which also agitates and aerates the fines and assists in separating the fines from the coarser material. In general, reduction in either the speed or size of the propeller 9 reduces the amount of material which will be recirculated by the propeller. Material to be recovered or discarded may be removed periodically through a valve 19.

The units of the conditioner, which may include some or all of the foregoing features, may be installed in a tank T which is provided with a feed inlet 21 adapted to supply pulp to a feed channel 22 between an end wall 23 of the tank and a vertical partition 24. Treatment and conditioning agents may be added at inlet 21, and the pulp flows downwardly in feed channel 22 where it passes through a plurality of holes 25 and 25', hole 25 leading to the portion of the pulp body opposite a hole 15 in housing 10, and holes 25' leading to a space 26 between the bottom 27 of the tank and a platform 28, spaced at a predetermined distance above the bottom of the tank. Housing 10 extends through platform 28, as shown, and impeller 5 is disposed in space 26 just beneath the platform, while trough 17 may be attached to the bottom 27 of the tank. A wear plate 29 may be attached to the underside of the platform, to prevent excessive wear on the platform, and an annular ring of holes 30 surrounds the wear plate to provide passage for conditioned pulp to the upper surface of the pulp body.

The incoming pulp passing through holes 25 may be directed to hole 15 in housing 10 by an inverted trough 31, which may have a top and sides only or a bottom and sides only or top, bottom and sides, as desired, and also may be spaced over one hole 30 or between two of holes 30. The end of trough 31 may be spaced a greater or lesser distance from partition 24, as desired. Suction of the impeller draws incoming pulp through the trough and into the housing, and pulp also is drawn into the housing through the opposite hole 15. The relative amounts of pulp fed through holes 25 and 25' may be proportioned in accordance with the pulp characteristics and operating conditions to achieve the desired results, which are also affected by the recirculation by propeller 9 and through holes 30 in platform 28. Some of the pulp also may flow through space 26 and holes 32 in a lower partition 33 beneath the platform to lower space 26 of the next unit. The units may all be interconnected above the platform, or a partition 34 disposed between columns 35 and having a hole 25 leading to a housing 31, as in the first unit, may separate the two units. The relative amount of pulp flowing through holes 32 and through hole 25 in partition 34 is proportioned, as in the case of the first unit, in accordance with the characteristics of the pulp being treated, operating conditions, and the results desired.

The treated pulp may be overflowed through a suitable weir 36 mounted on the sides of the tank, the height of the weir being adjusted by adding or removing blocks 37. There may be an overflow weir on opposite sides of the space occupied by each unit, and the ends of the weirs may be closed by side panels 38.

The tank may be supported in a suitable manner, as upon beams 39, and the agitation and aeration units may be supported by I-beams 40 which rest on beams 41 and 41' atop the tank. The tank may be made of suitable material, such as wood, and particularly where an acid pulp is being treated, metal parts such as the impeller and shaft, may be coated with rubber or the like, as shown, or formed of corrosion resistant metal or other suitable material.

Shaft 7 is rotated by a motor 42 mounted on I-beams 40 and directly connected by a V-rope drive with a pulley 43 attached to the top of shaft 7. The upper end of shaft 7 is journalled in suitable bearings within a relatively long housing 44, also mounted on I-beams 40. The bearings in housing 44 may include radial and thrust bearings, the radial bearings preferably being disposed adjacent the ends of the housing so as to steady the shaft and prevent any whipping action due to the impeller being suspended at a point considerably removed from the nearest bearing.

An air bonnet 45 is connected to the bearing housing, and is so constructed that air may pass by suction up through an inlet 46 into the interior of the housing. A suitable seal between the bonnet and housing may be obtained by packing 47 or the like. It will be understood, of course, that a suitable source of air under pressure may be connected to inlet 46 of the bonnet, and that gases other than air, such as for special treatment of the pulp or for catalytic purposes, or to overcome a particular condition, may be delivered to the bonnet through the inlet. Packing 47, of course, insures that all the air or other gas will be introduced into the pulp.

A further feature of the conditioner of this invention lies in the ease of inspection, repair and replacement of parts. It will be observed that the end of platform 28 is spaced from the end wall of the tank, and it is to be noted that the platform may be so spaced all the way around the tank. In case of a two-unit conditioner, the second unit may be connected to the first by platform 28 and I-beams 40, on the latter of which the motor and drive for the shaft of the second unit is placed. Or, the same motor may be utilized in driving both shafts. In any event, the two units are preferably so constructed that they may be lifted out of the tank together, platform 28 and beam 41' coming with the units, but beam 41 and the weir remaining on the tank. This renders relatively easy inspection of the impellers and parts adjacent thereto, and repair or replacement of parts such as wear plate 29, where necessary.

If desired, each unit may be made individually removable from the tank by splitting platform 28 just to the right of partition 34, in which case thickening of partition 33 may be necessary for adequate support of the platform, and by also splitting I-beam 40 above beam 41'. It will be understood, of course, that other suitable methods of constructing the units so as to be removable individually are possible.

From the foregoing, it is evident that the apparatus of this invention provides an adequate supply of air to the agitation and aeration zone established by the impeller, and also to the secondary agitation zone established by the propeller. As a conditioner stabilizes the feed from one machine to another and at the same time mixes completely or emulsifies the reagents, both agitation and aeration are helpful. Also, maximum aeration in the conditioner reduces the load on the flotation machine.

It will also be apparent that a conditioner constructed in accordance with this invention is efficient in operation, since undesirable or tramp material may be removed effectively as well as material too coarse to be effectively treated. Also, such material may be removed without also removing fines or other material which should proceed on in through the conditioner. Also, the conditioner is easily inspected and repaired, since the units may be lifted bodily from the tank without moving the tank itself, and the units may be constructed to be removed together or separately, as desired.

It will be understood that the principles of this invention may be applied to other agitating and aerating apparatus and processes, such as a flotation machine or similar equipment. It will also be apparent that various changes may be made in the apparatus of this invention. For instance, the conduit through the shaft may be provided with outlets which terminate adjacent the upper surface of the impeller, so as to feed air thereto, in addition to being provided with outlets for feeding air into the space below the impeller. Instead of atmospheric air, air under pressure may be supplied to bonnet 45, and air as well as water may be supplied through pipe 18. Also, if the operating problems are such that additional air beneath the impeller is unnecessary, the conduit may discharge all of its air into the space below the propeller at the lower end of the shaft. In addition, the propeller may be omitted in certain instances.

It will also be understood that the circulation and recirculation of pulp through the conditioner may be varied. For instance, the number and/or size of holes 25' and 32 may be varied, or these holes may be eliminated, and the size of holes 25 may be varied, to vary the relative amount of pulp flowing into the upper and lower spaces. Troughs 31 may be eliminated and a number of holes 25 in different positions, from those shown, may be provided; also, the number, size and location of holes 15 in housing 10 may be varied widely. Partition 34 may be eliminated in certain instances, or altered to different forms or shapes, and a suitable overflow baffle may be provided at the end of the second or last unit. Furthermore, either or both units may be fed from the sides and the overflow weirs located at the ends of the tank, and other and different tank constructions may be utilized.

It will be further understood that various changes in the apparatus of this invention in addition to those enumerated may be made, and that other embodiments of this invention may exist, all without departing from the spirit and scope thereof.

What is claimed is:

1. In agitation and aeration apparatus, an impeller disposed in the lower portion of a body of pulp or the like; a propelling device disposed beneath said impeller sufficiently close to said impeller to move settled material or the like upwardly toward said impeller and feed same directly thereto; and means for conducting air to the space below said impeller and also below said propelling device.

2. In agitation and aeration apparatus, an impeller disposed in the lower portion of a body of pulp; a shaft for rotating said impeller and extending downwardly from a point above the level of said body of pulp; a housing surrounding said shaft and adapted to lead air downwardly to the space above said impeller; and a conduit formed in said shaft for leading air downwardly from a point within said housing to a point below said impeller.

3. In agitation and aeration apparatus, an impeller disposed in the lower portion of a body of pulp; a shaft for rotating said impeller and extending downwardly to a point below said impeller; a housing surrounding said shaft and adapted to lead air downwardly from a point above the level of said pulp body to the upper surface of said impeller; a propeller device mounted on said shaft beneath said impeller and adapted to move pulp and settled materials upwardly toward said impeller; and a conduit formed in said shaft and extending from a point within said housing to a point below said impeller.

4. In agitation and aeration apparatus as defined in claim 3, wherein said conduit extends to a point beneath said propeller device and is adapted to lead air from within said housing to a point between said impeller and propeller device and also to a point below said propeller device.

5. In agitation and aeration apparatus, an impeller disposed in the lower portion of a body of pulp; a shaft for rotating said impeller and extending to a point above the level of the body of pulp; bearing means for said shaft at the upper end thereof; a housing surrounding said shaft for leading air downwardly to the space above said impeller; and a conduit formed in said shaft and extending from a point within said housing below said bearing means downwardly toward the lower end of said shaft, to supply air to said impeller.

6. In agitation and aeration apparatus, an impeller adapted to be disposed in the lower portion of a body of pulp; a shaft for suspending and rotating said impeller and extending upwardly to a point above the level of said body of pulp; a housing surrounding said shaft and extending downwardly from above said body of pulp to a point just above said impeller; an air bonnet surrounding said shaft and extending into said housing at the upper end thereof, said air bonnet being adapted to supply air from a point substantially above the level of said body of pulp to the interior of said housing; and a conduit formed in said shaft and extending from a point below said air bonnet downwardly in said shaft and adapted to supply air to said impeller.

7. In agitation and aeration apparatus, an agitating device adapted to be disposed in the lower portion of a body of pulp; a shaft for rotating said device; a second agitating device mounted on said shaft below said first mentioned device; a housing surrounding said shaft for delivering air to said upper agitating device; and conduit means for supplying air to the space between said agitating devices and also beneath the lower agitating device.

8. In agitation and aeration apparatus as defined in claim 7, wherein said conduit means is formed in said shaft.

9. A pulp conditioner comprising a tank for receiving a body of pulp; an impeller disposed in the lower portion of said body of pulp for agitating and aerating said pulp; a shaft for rotating said impeller and extending to a point beneath said impeller; a housing surrounding said shaft and extending from a point above the level of said body of pulp to said impeller and adapted to deliver air to said impeller; a propeller mounted on said shaft beneath said impeller; and a conduit formed in said shaft and extending from a point within said housing to the lower end of said shaft, said conduit being adapted to deliver air from within said housing and having outlets leading to the space between said impeller and propeller and to the space beneath said propeller.

10. A pulp conditioner comprising a tank for containing a body of pulp; an impeller disposed in the lower portion of said body of pulp for agitating and aerating said pulp; a shaft for rotating said impeller and extending to a point beneath said impeller; a housing surrounding said shaft and extending from a point above the level of said body of pulp to said impeller and adapted to deliver air to said impeller; a propeller mounted on said shaft beneath said impeller; a conduit formed in said shaft and extending from a point within said housing to the lower end of said shaft, said conduit being adapted to deliver air from within said housing and having an outlet leading to the space between said impeller and propeller and to the space beneath said propeller; a trough beneath said propeller; a liquid conduit connected with said trough and adapted to supply liquid to wash finer material upwardly to said propeller; and a valve adapted to permit drainage of coarse material settling in said trough.

11. A pulp conditioner comprising a tank for containing a body of pulp; an impeller disposed in the lower portion of said body of pulp for agitating and aerating said pulp; a shaft for rotating said impeller and extending to a point beneath said impeller; a housing surrounding said shaft and extending from a point above the level of said body of pulp to said impeller and adapted to deliver air to said impeller; a platform disposed above said impeller, said platform having apertures disposed adjacent the periphery of said impeller for passage of pulp and other material therethrough; means for supplying incoming pulp to the body of pulp; a propeller mounted on said shaft beneath said impeller; and a conduit formed in said shaft and extending from a point within said housing to the lower end of said shaft, said conduit being adapted to deliver air from within said housing and having outlets leading to the space between said impeller and propeller and to the space beneath said propeller.

12. Apparatus for conditioning pulp comprising a tank for containing a body of pulp; means for feeding pulp to be conditioned into said tank; a plurality of agitating and aerating units in said tank, there being a common feed to said units and each unit including at least an impeller, a shaft for rotating the impeller, and a housing surrounding the shaft for feeding air downwardly to the impeller, at least one of said units including a conduit formed in said shaft and extending from within said housing to a point below said impeller.

13. A pulp conditioner comprising a tank for containing a body of pulp; an agitating and aerating unit including an impeller disposed in the lower portion of said body of pulp, a shaft for rotating said impeller, a housing surrounding said shaft and extending from a point above the level of said body of pulp to said impeller, a platform disposed above said impeller, said platform having apertures disposed adjacent the periphery of said impeller for passage of pulp and other material therethrough, and means for rotating said shaft, said unit being constructed and arranged so as to be removable from said tank by lifting.

14. A conditioner as defined in claim 13, which includes a plurality of units having a common platform above the impellers thereof and a common support above said tank for said rotating means, said units being removable together from said tank by lifting.

15. In agitation and aeration apparatus, an agitating device adapted to be disposed in the lower portion of a body of pulp; a second agitating device adapted to be disposed beneath said first mentioned device and sufficiently close thereto to to feed settled material or the like directly thereto; means for rotating said agitating devices; means for conducting air to the space above said upper agitating device; and means for conducting air to the space between said agitating devices and also to the space below said lower agitating device.

ARTHUR C. DAMAN.